United States Patent [19]

Schwartz et al.

[11] 4,317,108
[45] Feb. 23, 1982

[54] VEHICLE THEFT PREVENTION DEVICE

[75] Inventors: Jerome Schwartz; George J. Infante, both of Philadelphia, Pa.

[73] Assignee: Taylor Lock Company, Philadelphia, Pa.

[21] Appl. No.: 153,410

[22] Filed: May 27, 1980

[51] Int. Cl.³ .................. B60R 25/04; B60R 25/10
[52] U.S. Cl. ................................ 340/64; 340/53; 307/10 AT
[58] Field of Search ............ 340/52 R, 53, 56, 63, 340/64; 280/287; 307/10 AT

[56] References Cited

U.S. PATENT DOCUMENTS

| | | | |
|---|---|---|---|
| 3,464,060 | 8/1969 | Arditti | 340/64 |
| 3,559,757 | 2/1971 | Weiss | 180/287 |
| 3,657,697 | 4/1972 | Schultz | 340/64 |
| 3,735,346 | 5/1973 | Fox | 340/63 |

Primary Examiner—Alvin H. Waring
Attorney, Agent, or Firm—Robert K. Youtie

[57] ABSTRACT

A device for electrical connection in an internal combustion engine, including a heat sensitive time delay switch connected in the ignition circuit to open, and/or connected in an alarm circuit to close after a predetermined period of engine operation, and a hidden disabling switch to disable the time delay switch for legitimate engine operation.

2 Claims, 1 Drawing Figure

VEHICLE THEFT PREVENTION DEVICE

BACKGROUND OF THE INVENTION

While there have been proposed, in the prior art, a substantial number of vehicle theft prevention devices, including those having time delays causing a delayed stoppage or disabling of a vehicle, such devices have heretofore been relatively complex and unreliable, required expert installation and maintenance, and been generally incapable of use with widely varying types of motor vehicles.

SUMMARY OF THE INVENTION

Accordingly, it is an important object of the present invention to provide a theft prevention device for motor vehicles of the type causing cessation of motor operation and/or alarm actuation after a predetermined period of time, which is extremely simple in construction and design, adapted to be installed on new and existing equipment with little or no special skill, durable and reliable throughout a long useful life, capable of operation by anyone knowing the location of a hidden switch, and which is extremely well adapted for use in conjunction with substantially all ignition type internal combustion engines.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

The single FIGURE shows elements of the ignition circuit of an internal combustion engine, including the theft prevention device of the present invention incorporated therein.

DESCRIPTION OF THE PREFERRED EMBODIMENT

Figure 1:
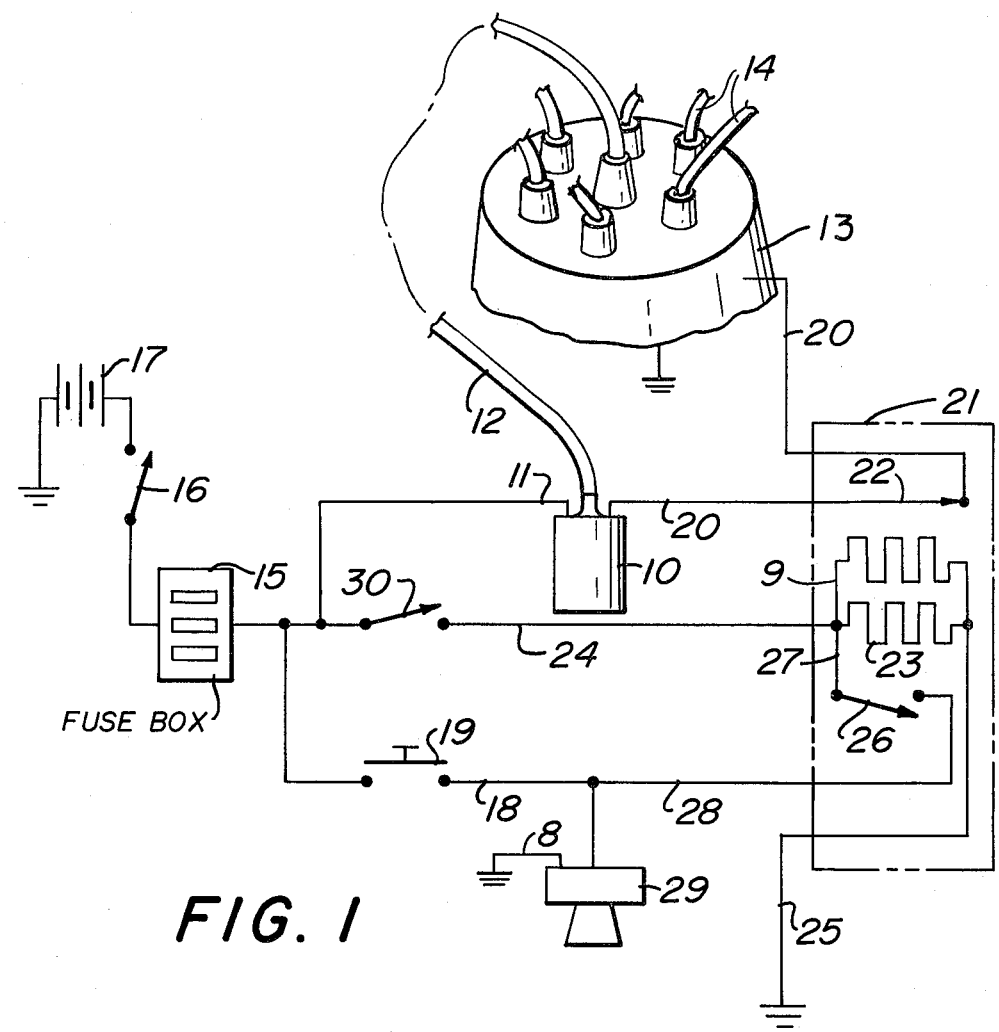

While the device of the present invention has been primarily developed and employed for use with automotive or wheeled vehicles, it is appreciated that the device of the present invention may be incorporated with equally advantageous results in air and water vehicles, as well as land vehicles, and in non-vehicular internal combustion engine installation to prevent unauthorized use.

In the FIGURE is shown an ignition coil, generally designated 10, which may have one low voltage side connected to a conductor 11. A high voltage conductor 12 may extend from the coil 10 to a distributor 13. A plurality of spark plug conductors 14 may extend from the distributor 13 to respective engine cylinders. The foregoing may all be conventional.

The other low voltage side of coil 10 may be connected by a conductor 20 to the points of distributor 13, and interposed in series connection in the conductor 20 is a time delay relay or switch 21 of the present invention.

The relay 21 may include a normally closed heat sensitive switch 22 connected in series with the conductor 20, say of the bimetallic type associated with an operating element or heater 9, or other suitable heat sensitive time delay switch.

Also incorporated in the relay 21 is an additional relay energizing or operating element, such as a heater or heat generator 23, connected in parallel with the heater 9. The parallel connected heaters or relay operating elements 23 and 9 may be connected, as by a conductor 24 through a fuse box 15 and vehicle ignition switch 16 to the plus or hot side of a battery 17. Connected in the line 24 may be an on-off control switch 30, for a purpose appearing presently. Remote from the conductor 24, the parallel operating elements or heaters 23 and 9 may be connected by a conductor 25 to ground.

The relay 21 further includes a normally open time delay switch 26, operatively associated with the heater 23, and connected at one side by a conductor 27 to the conductor 24 and connected at its other side by a conductor 28 to an alarm 29, such as an audible alarm, siren or horn, which may be grounded as at 8. Thus, upon closure of the ignition switch 16, control switch 30 and time delay switch 26, the audible alarm 29 is connected to the positive side of battery 17 for actuation thereby. Of course, if the alarm 29 requires other connection for actuation, suitable circuitry may be afforded through normally open time delay switch 26. For manual alarm operation, there may be provided a conductor 18 bypassing the time delay switch 26 and control switch 30, and including a manually actuable switch 19 for selective energization of the alarm.

The circuitry including time delay switches 22 and 26 are auxiliary to an internal combustion engine, and the control switch 30 is effectively concealed and its location known only to authorized users.

With the control switch 30 closed, the theft prevention device is set for operation. In such event, upon the closure of ignition switch 16 the engine may be started by the passage of current through closed switch 22. During running of the engine current is passing through operating element or heater 9 and shortly after starting of the engine, say about 10 seconds the heater 9 operates to open the heat sensitive switch 22 and stall or terminate engine operation.

Also, the operating element or heater 23 serves to close heat sensitive switch 26 after a predetermined interval of engine operation, say about 4–8 seconds, to energize the audible alarm 29. Upon opening of the ignition switch 16, the heat sensitive switches 22 and 26 will, upon cooling, revert to their normally closed and open conditions, respectively. However, upon repeated starting of the engine, the above described stalling and alarm operation will commence. Only upon opening of the control switch 30, which de-energizes the heaters 23 and 9, can the engine be continuously operated without stalling or alarm actuation. As the control switch is located in a concealed and secret place, which location is known only to authorized persons, the engine may be conditioned to stall and operate the alarm when left unattended and thereby effectively prevent or deter theft.

From the foregoing, it is seen that the present invention provides a theft prevention device for motor vehicles which is extremely simple in construction, installation, operation and maintenance, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A testable theft prevention device for an internal combustion engine having an auxiliary circuit, said device comprising a normally closed heat opening time delay switch for series connection in an auxiliary circuit to permit engine operation when the switch is in its unheated condition, electric heat generating switch operating means for connection in heat transfer relation with the switch to operate the latter upon heat generation on engine operation to effect theft prevention, and a selectively operable control switch connected to said operating means to enable and disable the latter, the auxiliary circuit including a coil, a distributor, and conductor means connected between said coil and distributor, and said time delay switch being adapted for electrical interposition in the conductor means, the auxiliary circuit further including an audible alarm, and additional conductor means connected to said audible alarm to electrically energize the latter, and a normally open heat closing time delay switch adapted for interposition in said additional conductor means and in heat transfer relation with said operating means.

2. A testable theft prevention device for an internal combustion engine having an auxiliary circuit, said device comprising a normally closed heat opening time delay switch for series connection in an auxiliary circuit to permit engine operation when the switch is in its unheated condition, electric heat generating switch operating means for connection in heat transfer relation with the switch to operate the latter upon heat generation on engine operation to effect theft prevention, and a selectively operable control switch connected to said operating means to enable and disable the latter, said auxiliary circuit including an ignition switch, and said operating means and control switch being connected in series with said ignition switch, the auxiliary circuit further including an audible alarm, and conductor means connected to said audible alarm to electrically energize the latter, and a normally open heat closing time delay switch adapted for interposition in said conductor means and in heat transfer relation with said operating means.

* * * * *